Patented Feb. 24, 1925.

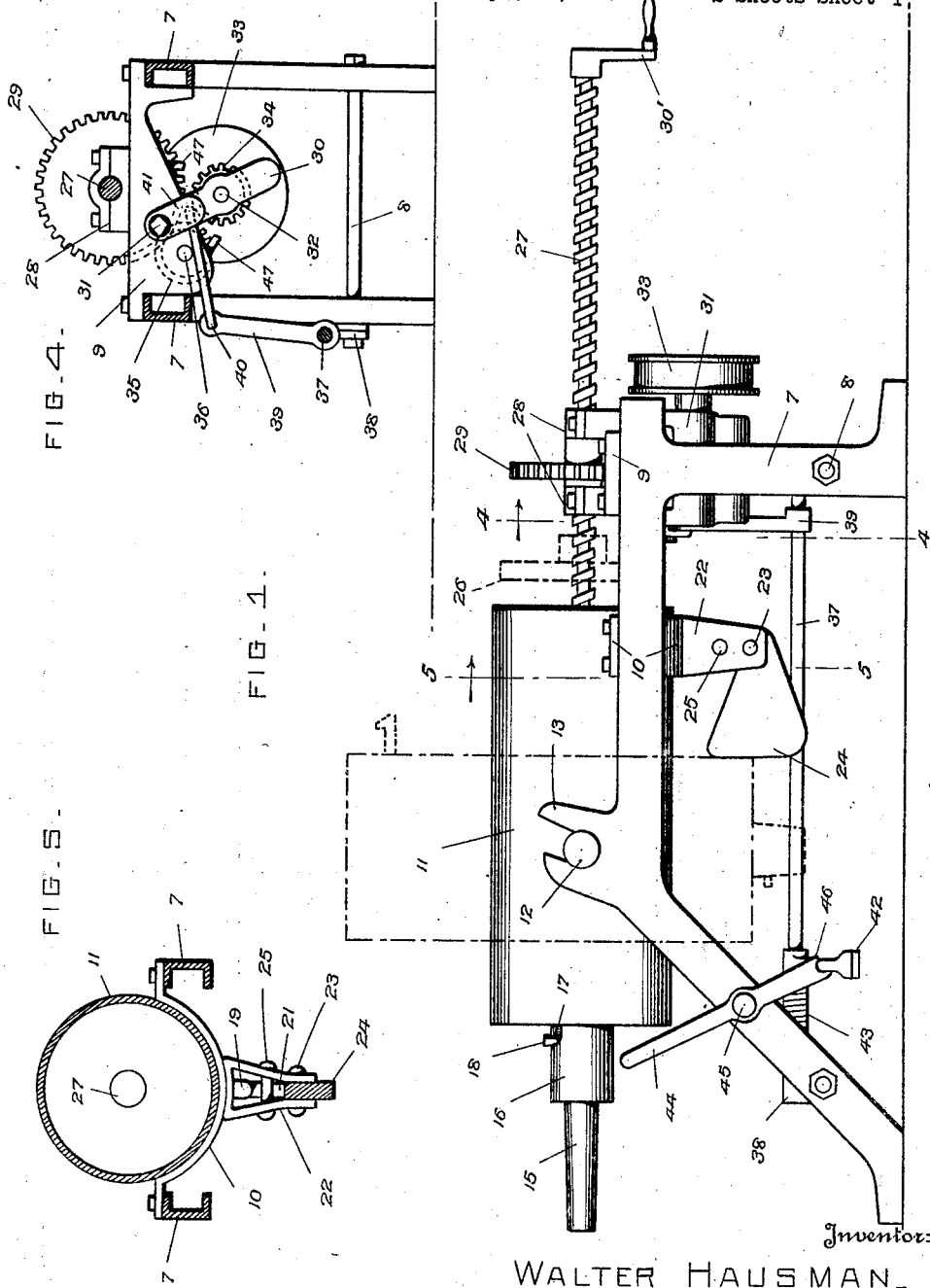

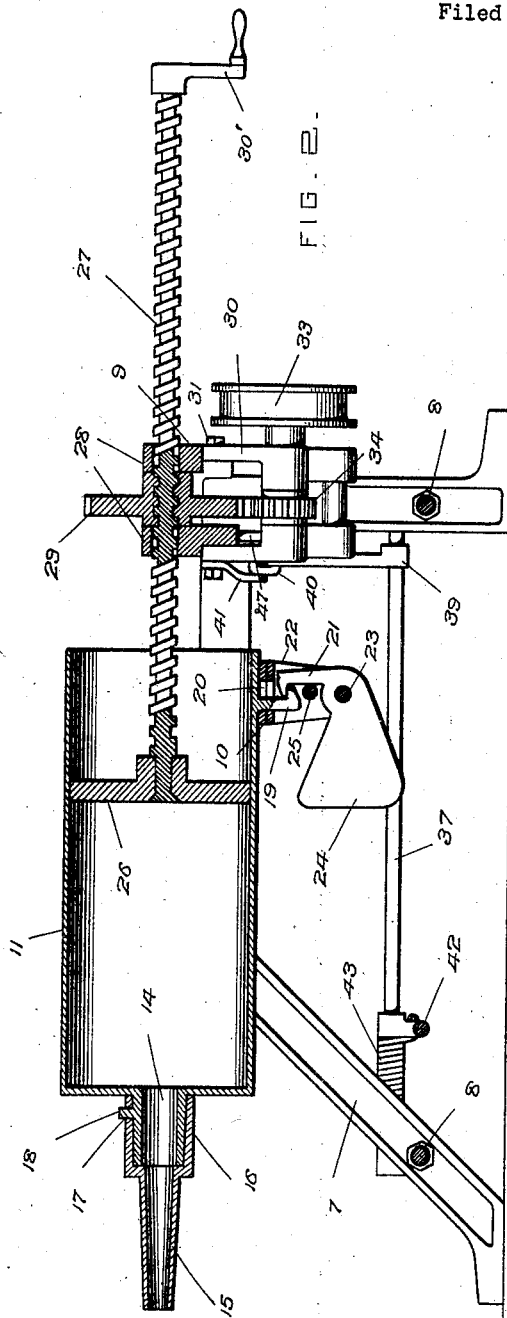
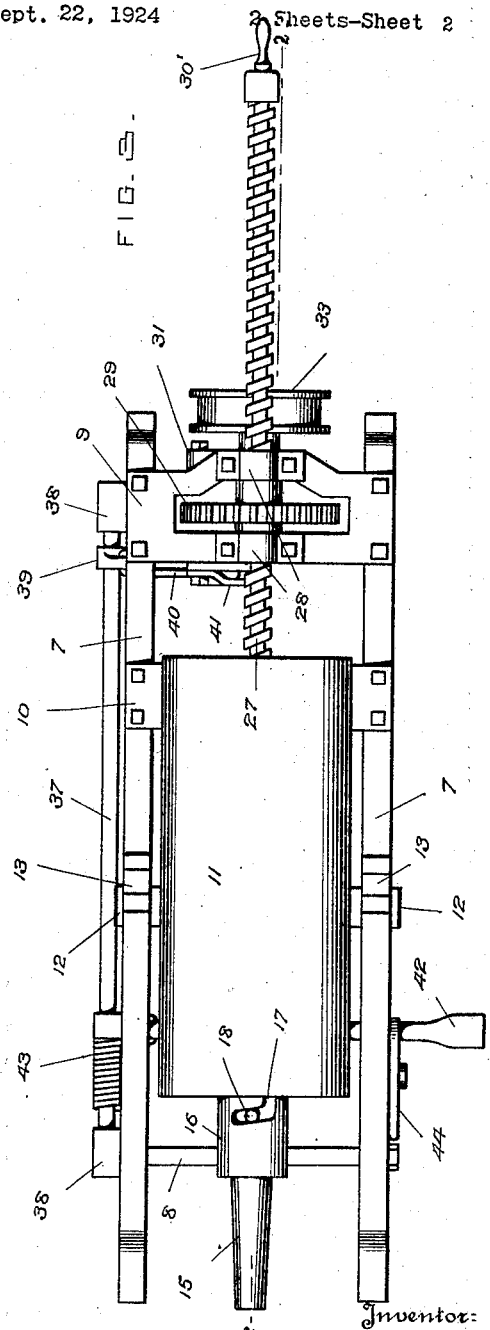

1,527,870

UNITED STATES PATENT OFFICE.

WALTER HAUSMAN, OF WAUKON, IOWA.

SAUSAGE STUFFER.

Application filed September 22, 1924. Serial No. 739,172.

*To all whom it may concern:*

Be it known that I, WALTER HAUSMAN, a citizen of United States, residing at Waukon, in the county of Allamakee and State of Iowa, have invented certain new and useful Improvements in Sausage Stuffers, of which the following is a specification, reference being had therein to the accompanying drawing.

The present invention relates to sausage stuffing machines, and aims to provide a machine of that kind comprising a novel construction and assemblage of the component elements, whereby the machine is advantageous and efficient in use.

As a more specific object, the invention aims to provide a sausage stuffer which is power driven under manual control in a convenient and facile manner, which is comparatively simple and inexpensive in construction, and which can be readily cleaned.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the machine, showing, in broken lines, the follower or piston retracted and the container or cylinder turned to vertical position.

Fig. 2 is a longitudinal vertical section on the line 2—2 of Fig. 3.

Fig. 3 is a plan view of the machine.

Figs. 4 and 5 are cross sections on the respective lines 4—4 and 5—5 of Fig. 1.

The frame of the machine comprises the side members 7 having their legs connected by the cross rods 8, and the upper portions of said members 7 are connected near one end by the cross member 9. A cross bar 10 is secured on the members 7 between the ends thereof and has a dropped curved portion between its ends and between the members 7, as seen in Fig. 5.

The container or cylinder 11 in which the ground meat or other material is held, is mounted between the side members 7 of the frame, said container having outstanding trunnions 12 at opposite sides between the ends thereof seated in the slotted seats 13 upstanding from the members 7, and when the container swings to normal horizontal position it seats on the bar 10. The forward end of the container 11 has a nipple 14 through which the material is discharged, and a nozzle 15 is detachably connected to said nipple. The nozzle has the enlarged portion 16 to fit snugly over the nipple 14, said nipple and portion being tapered so as to fit tightly together. The portion 16 has a bayonet slot 17 to engage a lug 18 on the nipple, whereby to secure the nozzle to the nipple when the nozzle is rotated on said nipple. Different sizes of nozzles, each having a portion 16, can be used interchangeably and the nozzle is readily removed from the container for purpose of cleaning. The container can be turned to vertical position, as shown in broken lines in Fig. 1, the nozzle 15 having been removed from the container, for convenience in placing the material in the container, and the container can also be readily lifted out of the slots in the seats 13 for cleaning the container.

The container 11 has a hook or keeper 19 to extend downwardly through an aperture 20 in the bar 10 when the container is swung against said bar to normal horizontal position, and a hook-shaped latch 21 is provided below said bar to engage the keeper 19 and retain the container in position. Said latch 21 is disposed within a hanger 22 secured to and depending from the bar 10, the latch being mounted on the pivot pin or rivet 23 extending through the hanger. The latch 21 has a weight 24 which swings the latch to a position to engage the keeper 19, and a pin or rivet 25 extends through the hanger 22 to serve as a stop to limit the movement of the latch 21 and retain the latch in position to engage the keeper 19. By raising the weight 24 the latch 21 is disengaged from the keeper 19, thereby permitting the container 11 to be swung to vertical position.

A follower or piston 26 is movable snugly in the container to force the material through the nozzle, and is secured to one end of a screw-threaded rod or stem 27 which slides through bearings 28 mounted on the cross member 9 at the rear end of the frame. The rear end of the container 11 is open for the passage of the follower into and out of the container, and when the follower is retracted from the container, as seen in broken lines in Fig. 1, the container can be swung to vertical position by releasing the latch 21 from the keeper 19 and the container can also be removed from the frame.

A gear wheel 29 is disposed between the bearings 28 and has its hub screw-threaded on the rod 27. The rear end of the rod 27 has a crank 30 whereby said rod can be turned manually if desired, with the wheel 29 held against rotation, for advancing or retracting the follower.

In order to rotate the wheel 29 by power, for advancing or retracting the follower, a U-shaped hanger 30 is pivoted at its ends, as at 31, to the cross member 9, and a shaft 32 is journaled through said hanger and has a pulley wheel 33 secured to the rear end thereof for connecting said shaft by a belt with a motor, although the shaft 32 can be rotated by power in any suitable manner. A pinion 34 is secured on said shaft 32 within the hanger to move into and out of mesh with the gear wheel 29. A pinion 35 meshing with the gear wheel 29 is mounted within the member 9 on a shaft 36 mounted in said member, and the pinion 34 is arranged to alternately engage the gear wheel 29 and pinion 35. When the pinion 34 meshes with the gear wheel 29, the gear wheel 29 is rotated in one direction on the rod 27 to move the follower in one direction longitudinally of the container, and when the pinion 34 meshes with the pinion 35, the direction of rotation of the gear wheel 29 is reversed so that the follower is moved longitudinally in the opposite direction. When the pinion 34 is in intermediate or neutral position the gear wheel 29 is not rotated. Thus, by swinging the hanger 30 the movement and position of the follower 26 is readily controlled.

In order to swing the hanger 30 under manual control, a rock shaft 37 is journaled in bearings 38 secured to one side member 7, and an upwardly extending arm 39 is secured to said shaft and is connected by a link 40 with the hanger 30. A retaining member 41 is secured to the hanger 30 by the pivot 31, and overlaps the link 40 to hold it in engagement with the hanger 30, said link being readily disengaged from the hanger when the retainer 41 is removed or turned away from the link. A treadle 42 is secured to the rock shaft 37 and projects to the opposite side of the frame to be depressed by one foot of the operator, leaving both hands free for other duties while operating the machine. A coiled torsion spring 43 is disposed on the rod 27 to turn said rod and raise the treadle 42, thereby swinging the arm 39 and hanger 30 toward the left, as seen in Fig. 4, to move the pinion 34 into engagement with the pinion 35. When the treadle is depressed by the foot, the shaft 37 is turned against the influence of the spring 43 to move the arm 39 and hanger 30 toward the right, as seen in Fig. 4, to move the pinion 34 into mesh with the gear wheel 29. A detent 44 is pivoted between its ends, as at 45, to one side member 7 to be swung by hand, the upper terminal of said detent providing a handle, and the lower end of the detent has a notch 46 to engage the treadle and limit the upward movement thereof by the spring 43, so that the hanger 30 and pinion 34 are maintained in neutral or intermediate position with the connection between the drive shaft 32 and gear wheel 29 open.

The member 9 has stops 47 to limit the swinging movement of the hanger 30, so as to prevent the pinion 34 from engaging too tightly with the gear wheel 29 and pinion 35.

The follower is readily advanced and retracted by operating the treadle 42 by the foot, leaving both hands free for other duties in connection with the operation of the machine, and when it is desired that the follower remain stationary with the shaft 32 rotating, the detent 44 is swung so that the treadle 42 seats upwardly in the notch 46, as seen in Fig. 1.

Having thus described the invention, what is claimed as new is:—

1. A machine of the character described comprising a frame, a container supported by the frame, a follower movable in the container, a rod secured to the follower and slidable in the frame, a gear wheel screw-threaded on said rod and assembled with the frame, a pinion carried by the frame and meshing with said gear wheel, a movable member carried by the frame, a drive shaft carried by said member, and a pinion on said drive shaft to alternately engage said gear wheel and firstnamed pinion.

2. A machine of the character described comprising a frame having side members, and a cross member, a container mounted between said side members, a screw-threaded rod slidable in said cross member, a follower secured to said rod and movable in said container, a gear wheel screw-threaded on said rod and assembled with said cross member, a hanger pivoted to said cross member, a pinion mounted in said cross member and meshing with said gear wheel, a drive shaft mounted in said hanger, and a pinion on the drive shaft to alternately mesh with the gear wheel and firstnamed pinion.

3. A machine of the character described comprising a frame having side members and a cross member at one end, a container trunnioned on said side members and located between them, said container having a discharge outlet at that end opposite to the cross member, means carried by the frame for latching the container in horizontal position, a screw-threaded rod slidable through said cross member, a follower secured to said rod and slidable in the container, a gear wheel screw-threaded on said rod and located within said cross member, a pinion carried by said cross member and meshing with said gear wheel, a hanger pivoted to said cross member, a drive shaft carried by said hanger, a pinion on the drive shaft to alternately mesh with said gear wheel and firstnamed pinion, and means for swinging said hanger.

In testimony whereof I hereunto affix my signature.

WALTER HAUSMAN.